United States Patent
Vijayakumari Rajendran Nair et al.

(10) Patent No.: US 9,582,206 B2
(45) Date of Patent: Feb. 28, 2017

(54) METHODS AND SYSTEMS FOR A COPY-OFFLOAD OPERATION

(71) Applicant: NETAPP, INC., Sunnyvale, CA (US)

(72) Inventors: Saji Kumar Vijayakumari Rajendran Nair, Cupertino, CA (US); Mudit Aggarwal, Santa Clara, CA (US)

(73) Assignee: NETAPP, INC., Sunnyvale, CA (US)

( * ) Notice: Subject to any disclaimer, the term of this patent is extended or adjusted under 35 U.S.C. 154(b) by 283 days.

(21) Appl. No.: 14/305,882

(22) Filed: Jun. 16, 2014

(65) Prior Publication Data

US 2015/0363125 A1    Dec. 17, 2015

(51) Int. Cl.
*G06F 12/00* (2006.01)
*G06F 3/06* (2006.01)

(52) U.S. Cl.
CPC .......... *G06F 3/0619* (2013.01); *G06F 3/065* (2013.01); *G06F 3/067* (2013.01); *G06F 3/0634* (2013.01)

(58) Field of Classification Search
CPC .............................. G06F 3/067; G06F 3/0619
See application file for complete search history.

(56) References Cited

U.S. PATENT DOCUMENTS 9,071,585 B2 *   6/2015   Green ................. H04L 67/1095
2012/0079583 A1 * 3/2012   Christiansen ........... G06F 3/061
                                                                    726/9

* cited by examiner

*Primary Examiner* — Ryan Bertram
*Assistant Examiner* — Edmund Kwong
(74) *Attorney, Agent, or Firm* — Nixon Peabody LLP; Khaled Shami

(57) ABSTRACT

Methods and systems for executing a copy-offload operation are provided. The method includes determining if content of a source data container can be changed, after the source data container is opened for a copy-offload operation to copy the source data container from a source location to a destination location. The method further includes using a direct copy mode for generating a token for the copy-offload operation, without taking a point in time image of the source data container, when the content cannot be changed based on a mode in which the source data container is opened; and selecting a point in time copy mode by taking the point in time image of the source data container for generating the token, when the content can be changed.

21 Claims, 13 Drawing Sheets

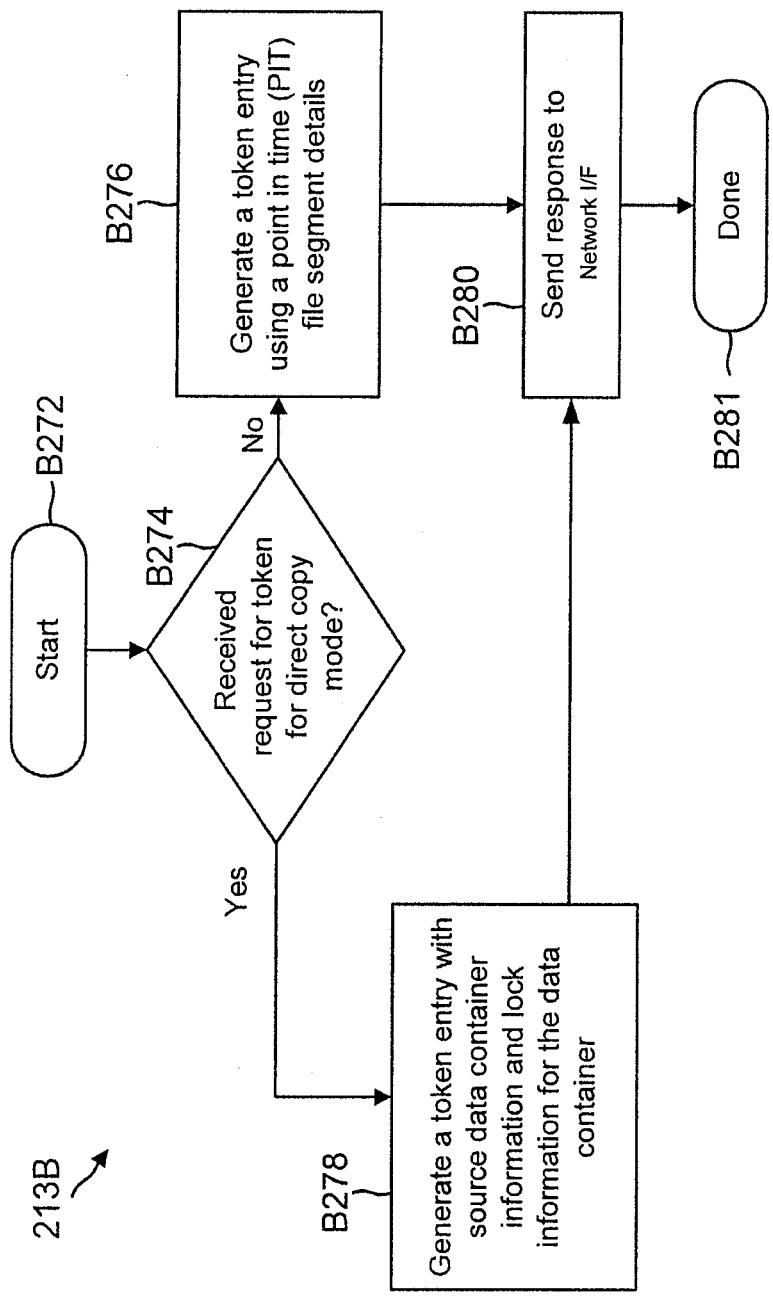

METHODS AND SYSTEMS FOR A COPY-OFFLOAD OPERATION

TECHNICAL FIELD

The present disclosure relates to storage systems and more particularly to performing copy-offload operations.

BACKGROUND

Various forms of storage systems are used today. These forms include direct attached storage (DAS), network attached storage (NAS) systems, storage area networks (SANs), and others. Storage systems are commonly used for a variety of purposes, such as providing multiple users with access to shared data, backing up data and others.

A storage system typically includes at least a computing system (may also be referred to as a "server" or "storage server"), which is a processing system configured to store and retrieve data on behalf of one or more client computing systems ("clients"). The storage system may be presented to a client system for storing information.

Traditionally, when a client system intends to copy data from a source storage location to a destination storage location, the storage system retrieves the data, provides the data to the client system, the client system saves the data at a memory location and then data is transferred to the destination storage location. The source and the destination storage locations may be within a same storage device or different storage devices.

The traditional client centric copy approach described above has shortcomings because it consumes processing resources as well as network bandwidth. To alleviate the shortcomings of the traditional approach, a token based "copy-offload" process is one technique that is used to copy a source data container from a source location to a destination location without having to send the actual data to the client.

The following process steps are typically used in a conventional method to copy a source data container from a source location to a destination location, using a copy-offload operation: (a) In response to a copy-offload request, a source data container is opened and then read. (b) A token that represents information of the source data container at any given time is generated. A point in time copy (or a snapshot) of the data container is taken to generate the token. (c) The token is provided to the client and the client then sends an offload write request. (d) A destination data container is opened and then using the token, the data container is copied from the source location. Generating the token by taking the snapshot is undesirable since it uses processing time and may limit a size of the token. Continuous efforts are being made to efficiently perform copy-offload operations, preferably without taking a point in time copy of the data container that is being copied.

SUMMARY

In one aspect, a machine implemented method is provided. The method includes determining if content of a source data container can be changed, after the source data container is opened for a copy-offload operation having an offload read operation and an offload write operation to copy the source data container from a source location to a destination location. To execute an offload read request, a storage system that manages a storage device returns a token to a client in response to the offload read request, where the token represents the content of the source data container.

The method further includes using a direct copy mode for generating the token for the offload read operation, without taking a point in time image of the source data container, when the content cannot be changed based on a mode in which the source data container is opened; and selecting a point in time copy mode by taking the point in time image of the source data container for generating the token, when the content can be changed.

In another aspect, a non-transitory, machine readable storage medium having stored thereon instructions for performing a method for a copy-offload operation is provided. The machine executable code which when executed by at least one machine, causes the machine to: determine if content of a source data container can be changed, after the source data container is opened for a copy-offload operation having an offload read operation and an offload write operation to copy the source data container from a source location to a destination location. To execute an offload read request, a storage system that manages a storage device returns a token to a client in response to the offload read request, where the token represents the content of the source data container.

The machine executable code which when executed by at least one machine, further causes the machine to: use a direct copy mode for generating the token for the offload read operation, without taking a point in time image of the source data container, when the content cannot be changed based on a mode in which the source data container is opened; and select a point in time copy mode by taking the point in time image of the source data container for generating the token, when the content can be changed.

In yet another aspect, a system with a memory having machine readable medium comprising machine executable code having instructions stored thereon; and a processor module coupled to the memory configured to execute the machine executable code is provided. The machine executable code is executed to determine if content of a source data container can be changed, after the source data container is opened for a copy-offload operation having an offload read operation and an offload write operation to copy the source data container from a source location to a destination location. To execute an offload read request, a storage system that manages a storage device returns a token to a client in response to the offload read request, where the token represents the content of the source data container.

The machine executable code further uses a direct copy mode for generating the token for the offload read operation, without taking a point in time image of the source data container, when the content cannot be changed based on a mode in which the source data container is opened; and selects a point in time copy mode by taking the point in time image of the source data container for generating the token, when the content can be changed.

This brief summary has been provided so that the nature of this disclosure may be understood quickly. A more complete understanding of the disclosure can be obtained by reference to the following detailed description of the various aspects thereof in connection with the attached drawings.

BRIEF DESCRIPTION OF THE DRAWINGS

The various features of the present disclosure will now be described with reference to the drawings of the various aspects of the present disclosure. In the drawings, the same components may have the same reference numerals. The illustrated aspects are intended to illustrate, but not to limit the present disclosure. The drawings include the following Figures:

FIGS. 2D-2I show various process flow diagrams according to the various aspects of the present disclosure;

DETAILED DESCRIPTION

As a preliminary note, as used in this disclosure, the terms "component" "module", "system," and the like are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computing device. By way of illustration, both an application running on a server and the server can be a component. One or more components may reside within a process and/or thread of execution and a component may be localized on one computer and/or distributed between two or more computers. Also, these components can execute from various non-transitory, computer readable media having various data structures stored thereon.

The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick, non-transitory storage media or any other storage device type, in accordance with the claimed subject matter.

In one aspect, methods and systems for executing a copy-offload operation are provided. The method determines if content of a source data container cannot be changed based on a mode in which the source data container is opened, to copy the source data container from a source location to a destination location. A direct copy mode is used for generating a token for the copy-offload operation, without taking a point in time image of the data container, when the content cannot be changed. A point in time copy mode is used by taking a point in time image of the data container for generating the token, when the content of the data container can be changed.

Figure 1:
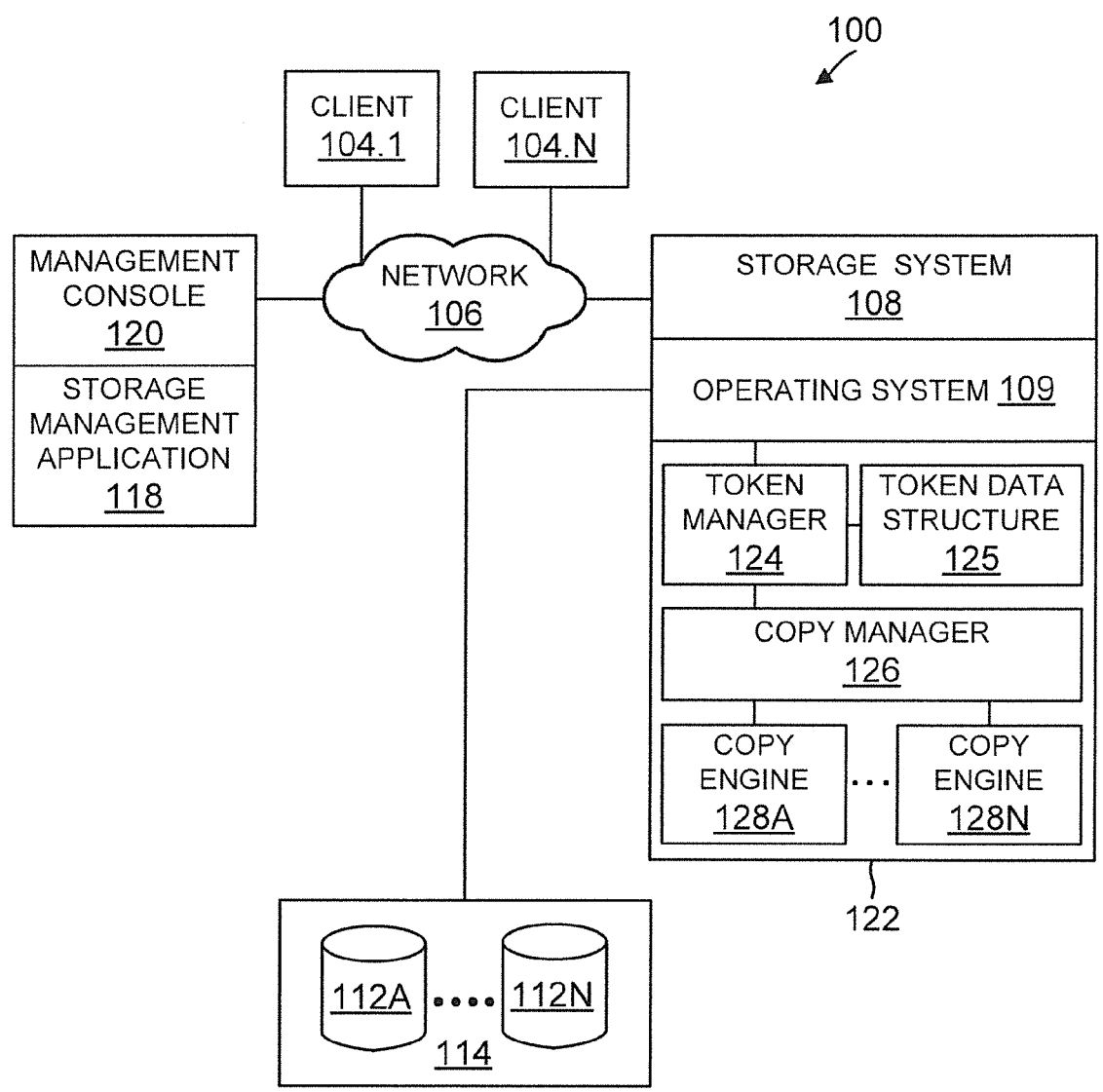
FIG. 1 shows an example of a non-cluster based storage environment, used according to one aspect of the present disclosure.

Non-Clustered Storage Environment 100:

FIG. 1 depicts an illustrative aspect of a non-clustered storage environment 100, including a plurality of client computing systems/devices 104.1-104.N (may also be referred to as client 104 or clients 104), one or more storage system 108, a management console 120 and at least one interconnect system (or network) 106 communicably connecting client systems (or computing devices) 104.1-104.N, storage systems 108 and management console 120.

The storage system 108 may include or interface with a storage subsystem 114 having multiple mass storage devices 112A-112N (may also be referred to as storage device or storage devices 112). The mass storage devices 112 may be, for example, conventional magnetic disks, optical disks such as CD-ROM or DVD based storage, magneto-optical (MO) storage, or any other type of non-volatile storage devices suitable for storing structured or unstructured data.

The storage system 108 executes a storage operating system 109 for managing storage space within storage subsystem 114 and presenting storage space to clients 104. As an example, storage operating system 109 maybe the DATA ONTAP® storage operating system, available from NetApp®, Inc., that implements a Write Anywhere File Layout (WAFL®) storage system, or any other suitable storage operating system (without derogation of any trademark rights).

In one aspect, storage system 108 also includes a copy system 122 that includes a token manager 124, a copy manager 126 and copy engines 128A-128N for executing copy-offload operations. A copy-offload request may be received from one or more of clients 104 to copy certain data containers from a source location to a destination location. In response to the client request, the token manager 124 generates a token, which is a representation of the data that is being copied at any given time. The token manager 124 uses a data structure 125 to track the tokens that are generated by the token manager 124. It is noteworthy that although for clarity the token data structure 125 is shown in a separate block, it can be implemented as part of token manager 124.

The copy manager 126 interfaces between the token manager 124 and the storage operating system 109. The copy engines 128 are used for performing the actual copy operations. Details regarding copy-offload operations are provided below.

Storage operating system 109 and applications running on the client systems 104.1-104.N communicate according to well-known protocols, such as the NFS protocol or the CIFS protocol, to make data stored at storage device 112 appear to users and/or application programs as though the data were stored locally at the client systems 104.1-104.N. CIFS means the Common Internet File System Protocol, an access protocol that client systems use to request file access services from storage systems over a network. NFS means a Network File System, a protocol that allows a user to access storage over a network.

Storage operating system 109 can present or export data stored at storage devices 112 as a volume (may also be referred to as a storage volume), or one or more qtree sub-volume units, to each of the client systems 104.1-104.N. In one aspect, a volume is a logical data set which is an abstraction of physical storage, combining one or more physical mass storage devices or parts thereof into a single logical storage object. From the perspective of a client system 104, each volume can appear to be a single storage drive. However, each volume can represent the storage space in one storage device, an aggregate of some or all of the storage space in multiple storage devices, a RAID group, or any other suitable set of storage space. Each volume may be configured to store data containers, for example, data files, scripts, word processing documents, executable programs, structured and unstructured data and the like. Specifically, each volume can include a number of individually addressable files.

The storage operating system 109 may implement a high-level module, such as a file system, to logically organize the information stored at storage devices 112 as a hierarchical structure of directories, files, blocks, structured and un-structured data (may be referred to as data containers). For example, each "on-disk" data container may be implemented as set of data structures, i.e., blocks, configured to store information, such as the actual data for storage volumes. These data blocks are organized within a logical volume block number (vbn) space that is maintained by the file system. The file system organizes the storage data blocks within the vbn space as a "logical volume"; each logical volume may be, although is not necessarily, associated with its own file system.

In a typical mode of operation, one of the client systems 104.1-104.N transmits one or more I/O (input/output) commands, such as an NFS or CIES request, over network 106 to the storage system 108 to read or write information. The storage system 108 issues one or more I/O commands to storage device 112 to read or write the data on behalf of the client system. The storage system 108 also issues an NFS or CIFS response containing the requested data over network 106 to the client system.

The management console 120 may be, for example, a conventional PC, workstation, or the like. The storage management application 118 can be a software application, typically used by a storage network administrator to manage a pool of storage devices and other modules of system 100. The management application 118 may be used to configure "a direct copy mode" or a default "point in time" copy mode for generating tokens for copy-offload operations, as described below in detail.

Communication between the storage management application 118 and storage system 108 may be accomplished using any of the various conventional communication protocols and/or application programming interfaces (APIs), the details of which are not germane to the technique being introduced here. This communication may be enabled by network 106 or via a direct link (not shown) between the management console 120 and one or more of the storage systems.

Figure 2A:
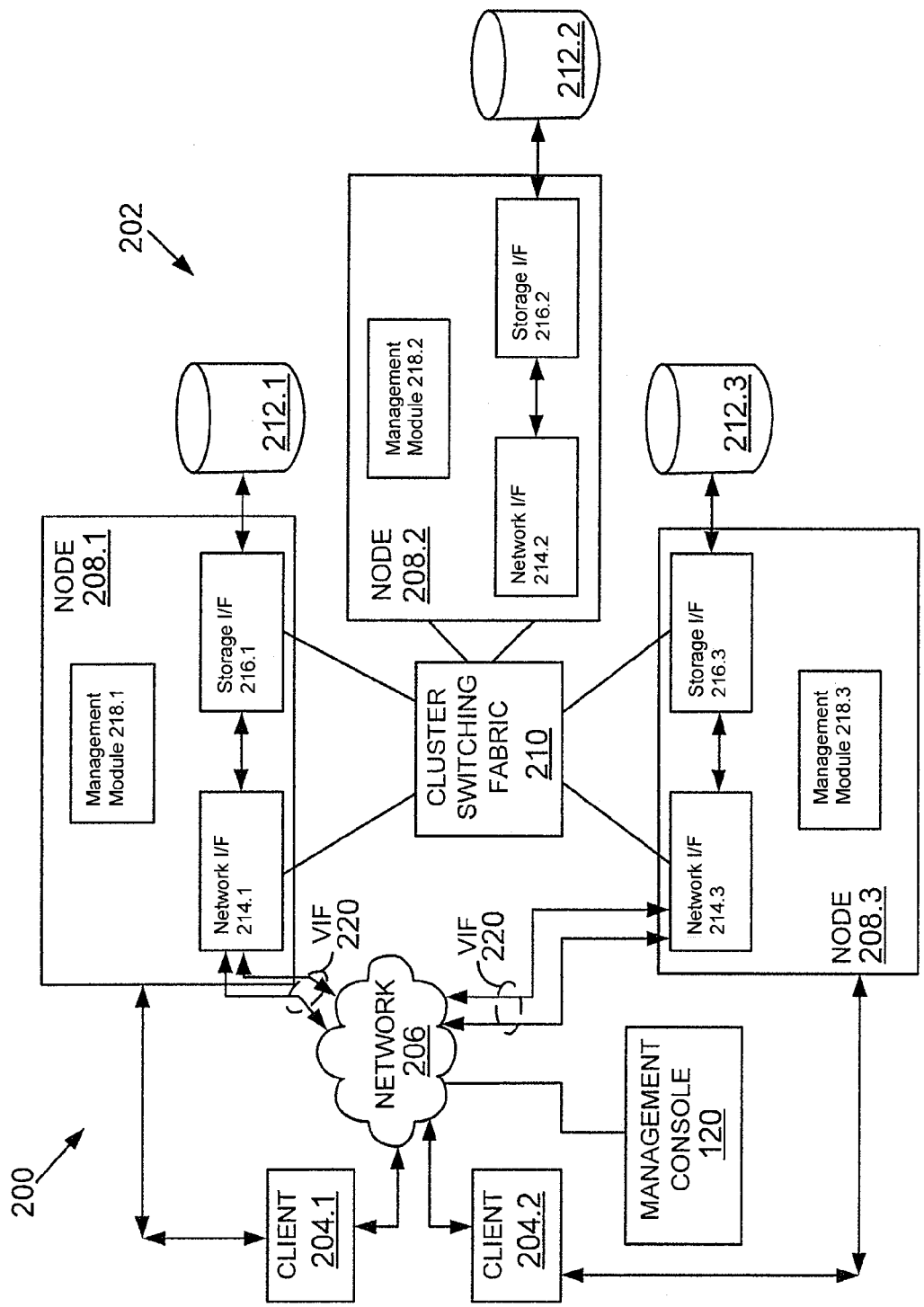
FIG. 2A shows a block diagram of a cluster based storage system, used according to one aspect of the present disclosure.

Clustered Storage Environment 200:

The adaptive aspects described herein can be implemented in a cluster based system that has a distributed architecture, unlike the monolithic architecture of the non-clustered environment. FIG. 2A depicts an illustrative aspect of a clustered storage environment 200 including a plurality of client systems 204.1-204.2 (similar to clients 104.1-104.N), a clustered storage system 202 and at least one computer network 206 communicably connecting the client systems 204.1-204.2 and the clustered storage system 202. The clustered storage system 202 includes a plurality of nodes 208.1-208.3, a cluster switching fabric 210, and a plurality of mass storage devices 212.1-212.3.

Each of the plurality of nodes 208.1-208.3 may be configured to operate as a source storage system or a destination storage system. Each node may include a network interface, a storage interface, and a management module, each of which can be implemented as a separate processor executable or machine implemented module. Specifically, node 208.1 includes a[[n]] network interface 214.1, a storage interface 216.1, and a management module 218.1, node 208.2 includes a network interface 214.2, a storage interface 216.2, and a management module 218.2, and node 208.3 includes a network interface 214.3, a storage interface 216.3, and a management module 218.3.

The network interfaces 214.1-214.3 include functionality that enables the respective nodes 208.1-208.3 to connect to one or more of the client systems 204.1-204.2 over the computer network 206, while the storage interfaces 216.1-216.3 connect to one or more of the storage devices 212.1-212.3.

The management modules 218.1-218.3 provide management functions for the clustered storage system 202. Accordingly, each of the plurality of server nodes 208.1-208.3 in the clustered storage server arrangement provides the functionality of a storage server.

A switched virtualization layer including a plurality of virtual interfaces (VIFs) 220 is provided below the interface between the respective network interfaces 214.1-214.3 and the client systems 204.1-204.2, allowing storage 212.1-212.3 associated with the nodes 208.1-208.3 to be presented to the client systems 204.1-204.2 as a single shared storage pool. For example, the switched virtualization layer may implement a virtual interface architecture. FIG. 2A depicts only the VIFs 220 at the interfaces to the network interfaces 214.1, 214.3 for clarity of illustration.

The clustered storage system 202 can be organized into any suitable number of "vservers", in which each virtual storage system represents a single storage system namespace with separate network access. Each vserver has a user domain and a security domain that are separate from the user and security domains of other virtual storage systems. Client systems can access storage space via a VServer from any node of the clustered system 202.

Each of the nodes 208.1-208.3 may be defined as a computer adapted to provide application services to one or more of the client systems 204.1-204.2. The nodes 208.1-208.3 are interconnected by the switching fabric 210, which, for example, may be embodied as a Gigabit Ethernet switch or any other interconnect type.

Although FIG. 2A depicts three network interfaces 214.1-214.3, the storage interfaces 216.1-216.3, and the management modules 218.1-218.3, any other suitable number of network interfaces, storage interfaces, and management modules may be provided. There may also be different numbers of network interfaces, storage interfaces, and/or tests management modules within the clustered storage system 202. For example, in alternative aspects, the clustered storage system 202 may include a plurality of network interfaces and a plurality of storage interfaces interconnected in a configuration that does not reflect a one-to-one correspondence between the network interfaces and storage interfaces.

The client systems 204.1-204.2 of FIG. 2A may be implemented as general-purpose computers configured to interact with the respective nodes 208.1-208.3 in accordance with a client/server model of information delivery. In the presently disclosed aspect, the interaction between the client systems 204.1-204.2 and the nodes 208.1-208.3 enable the provision of network data storage services. Specifically, each client system 204.1, 204.2 may request the services of one of the respective nodes 208.1, 208.2, 208.3, and that node may return the results of the services requested by the client system by exchanging packets over the computer network 206, which may be wire-based, optical fiber, wireless, or any other suitable combination thereof. The client systems 204.1-204.2 may issue packets according to file-based access protocols, such as the NFS or CIFS protocol, when accessing information in the form of files and directories.

Figure 2B:
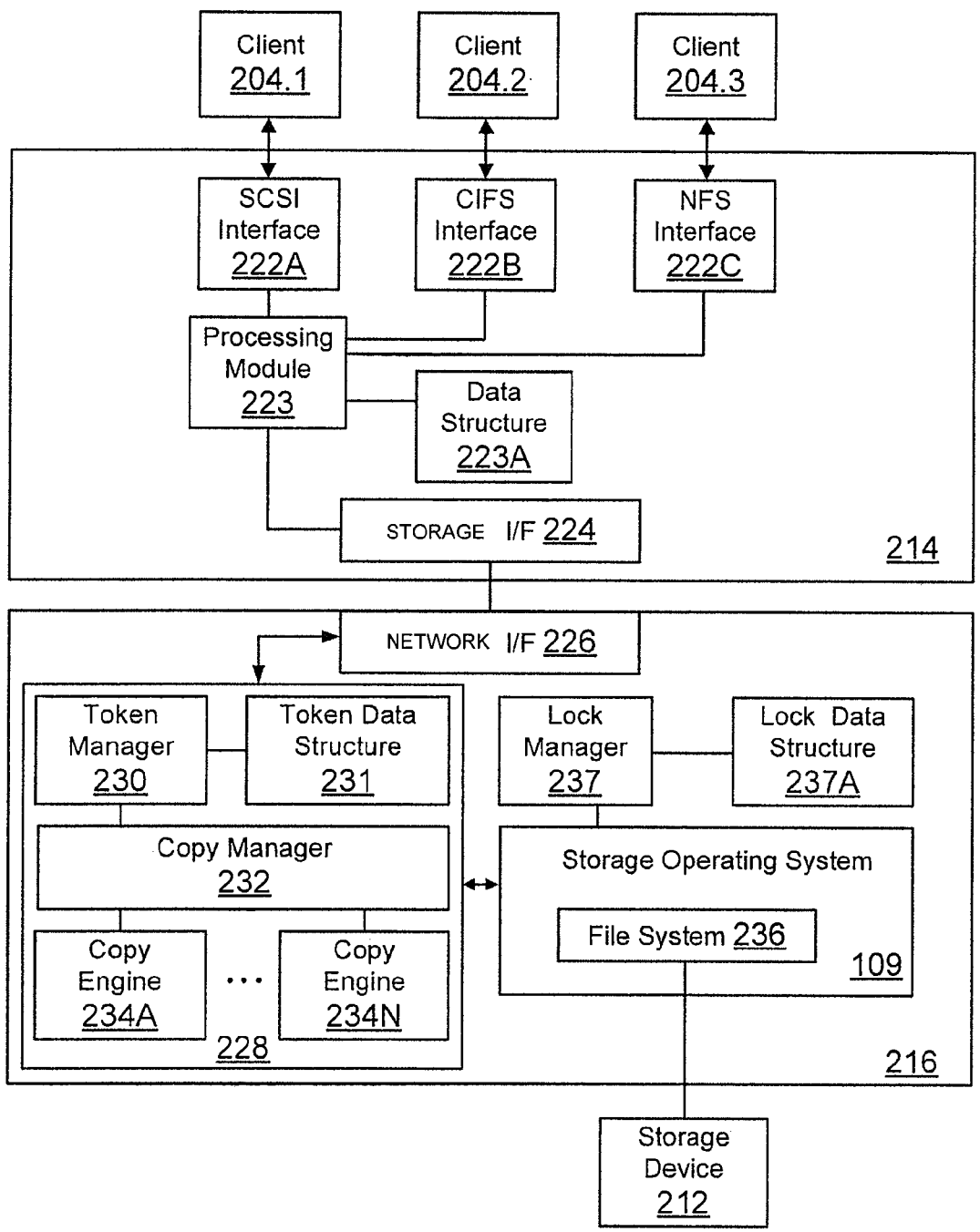
FIGS. 2B-2C show examples of systems for implementing a copy-offload operation, according to one aspect of the present disclosure.

FIG. 2B shows a block diagram of implementing a copy-offload system 228 in a clustered environment, according to one aspect. Copy-offload system 228 is similar to the copy-offload system 122 described above with respect to FIG. 1.

As shown in FIG. 2B, network interface 214 includes different interface types to receive client requests that comply with different protocols. For example, network interface 214 includes a SCSI interface 222A to receive SCSI requests from a client 204.1; a CIFS interface 222B for receiving CIFS requests from a client 204.2 and a NFS interface 222C to receive requests from client 204.3. Network interface 214 includes a processing module 223 that maintains a data structure 223A for processing copy-offload requests, as described below in detail. It is noteworthy that although the processing module 223 is shown as a separate entity, it can be implemented as part of the various interfaces 222A-222C. Data structure 223A is used to maintain the state for all client connections and requests that are being processed at any given time. It is noteworthy that data structure 223A may be part of the CIFS interface 222B and NFS interface 222C. Network interface 214 further includes a storage interface 224 for communicating with storage interface 216.

Storage interface 216 includes a network interface 226 for sending and receiving information to and from network interface 214. Storage interface 216 also executes a file system 236 that is a part of the overall storage operating system 109 described below in detail. The file system 236 interfaces with storage device 212 for reading and writing data.

Storage interface 214 executes one or more components of the copy-offload system 228. The copy-offload system 228 interfaces with the file system 236, as described below in detail. The copy-offload system includes a token manager 230 (similar to 124), a copy manager 232 (similar to 126) and copy engines 234A-234N (similar to 128A-128N). The various functions executed by the copy-offload system 228 are described below.

In one aspect, the storage operating system 109 maintains a plurality of lock types in responding to client requests for reading a data container, writing a data container or modifying a data container. The following provides an example of different lock types that may be used for managing access to data containers. The various aspects described herein are not limited to any particular lock type.

A "Shared Lock" is typically granted to a client application by storage operating system 109. The shared lock in the CIFS context represents an "open-mode", which defines the nature of access for an entity that opened the lock and what other applications/entities are allowed to do. For example, when the shared lock is opened for read and write for a data container and shared for just read, then the entity that opened the lock can read and write, while other entities are only permitted to read the data container.

"Byte lock" is a lock type that limits access to a portion of a data container. A client may request to open a data container and request a lock for a byte range of the file.

To manage the various locks, the storage operating system 109 interfaces with or includes a lock manager 237 that maintains one or more lock data structures 237A. Data structure 237A identifies the data containers against which locks may have been granted and the identity of the application or client to whom the lock is granted. The lock data structure 237A also stores lock attributes indicating the lock type. It is noteworthy that although the lock data structure 237A is shown as a separate block for clarity, it can be implemented as an integral part of the lock manager 237.

Figure 2C:
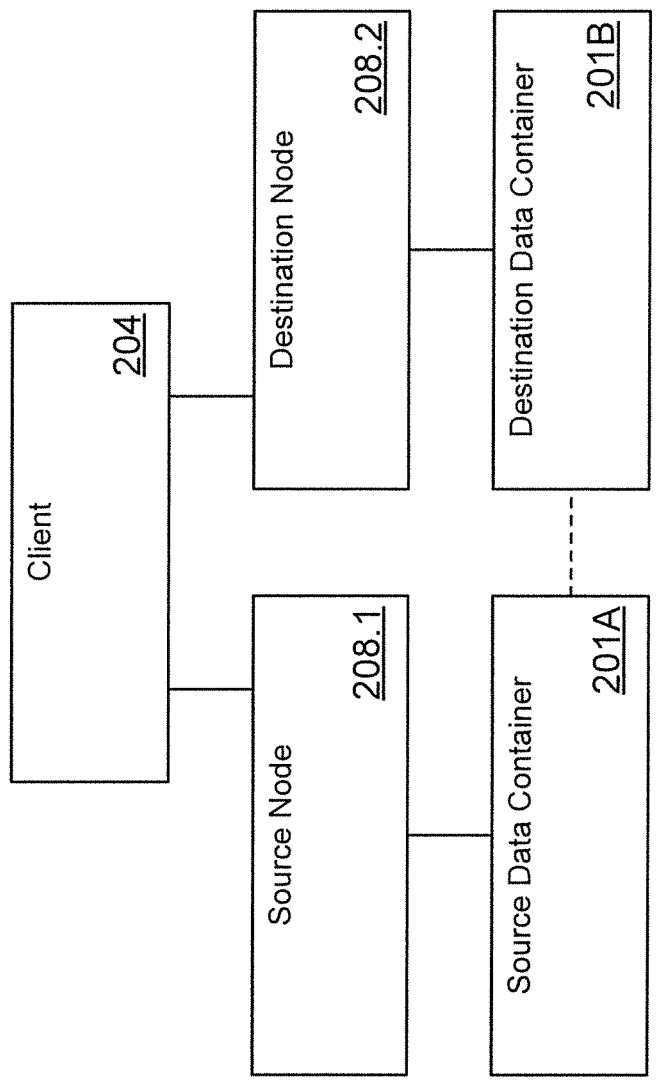

FIG. 2C shows a high level system for executing a copy-offload operation using the direct copy mode, according to one aspect. Source data container 201A is managed by a source node 208.1 described above with respect to FIGS. 2A-2B and then copied to a destination data container 201B, managed by a destination node 208.2 (also shown in FIG. 2A), as described below with respect to the process flow of FIG. 2D-2I. It is noteworthy that although the source and data containers are shown as being managed by separate nodes, the various aspects described herein are not limited to separate nodes and can be implemented when the source and destination nodes are the same node i.e. the same node manages the source and destination location.

Figure 2D:
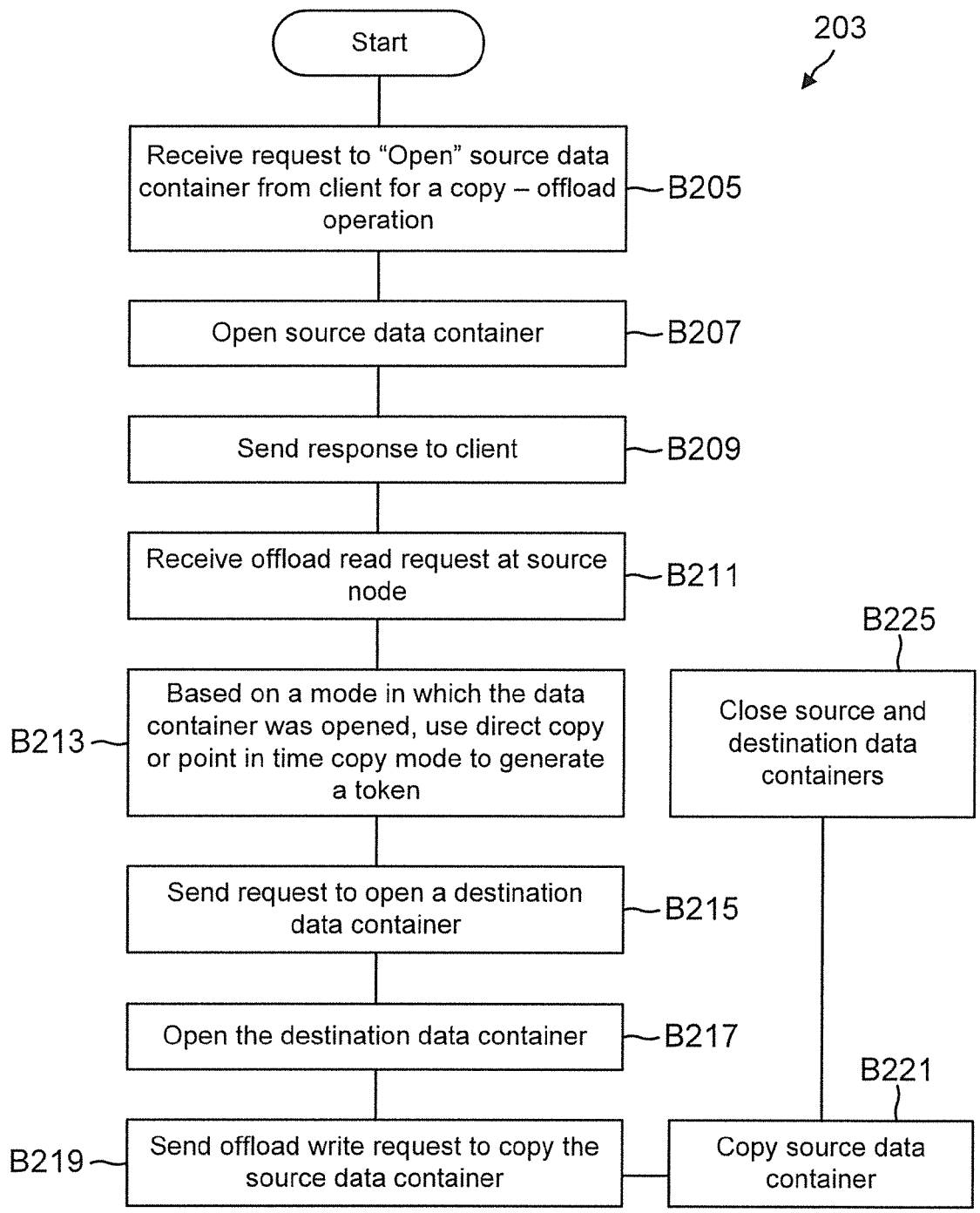

Process Flow:

FIG. 2D shows an overall process 203 for using a direct copy mode for generating a token for a copy-offload request, without having to use a point in time copy of a source data container, according to one aspect of the present disclosure. The process begins in block B205, when client 204, source node 208.1 and destination node 208.2 are initialized and operational. The network interface 214 of the source node 208.1 receives a request to "open" a data container in response to a copy-offload operation. In block B207, the source data container is opened. The state in which the source data container is opened determines the mode that is used for generating a token for copy-offload operation. For example, if the source data container is opened in a read-only mode or a shared read mode that only allows read access, then the source data container cannot changed while that state remains unchanged and a direct copy mode is used, as described below in detail, otherwise, a point-in-time copy mode is used. The network interface 214 maintains the state in which the source data container is opened and stores the state in data structure 223A.

After the data container is opened, the network interface 214 of the source node sends a response to the client in block B209. The client then sends an "offload-read" request to the network interface 214 of the source node to read the source data container in block B211. The network interface 214 knows the state in which the source data container was opened and determines if the direct copy mode or the point-in-time copy mode is to be used for generating the token. Based on the selected mode, as described below in detail, a token is generated and provided to the client in block B213.

In block B215, the client sends a request to a network interface of the destination node 208.2 to open the destination data container 201B for the copy-offload operation. The destination node 208.2 opens the destination data container in block B217. It is noteworthy that if the source and destination nodes are the same, then the request is sent to the same node.

An offload-write request is then sent by the client with the token in block B219. The data from the source data container is then copied in block B221. Thereafter, both the source and destination data containers are closed in block B225.

Figure 2E:
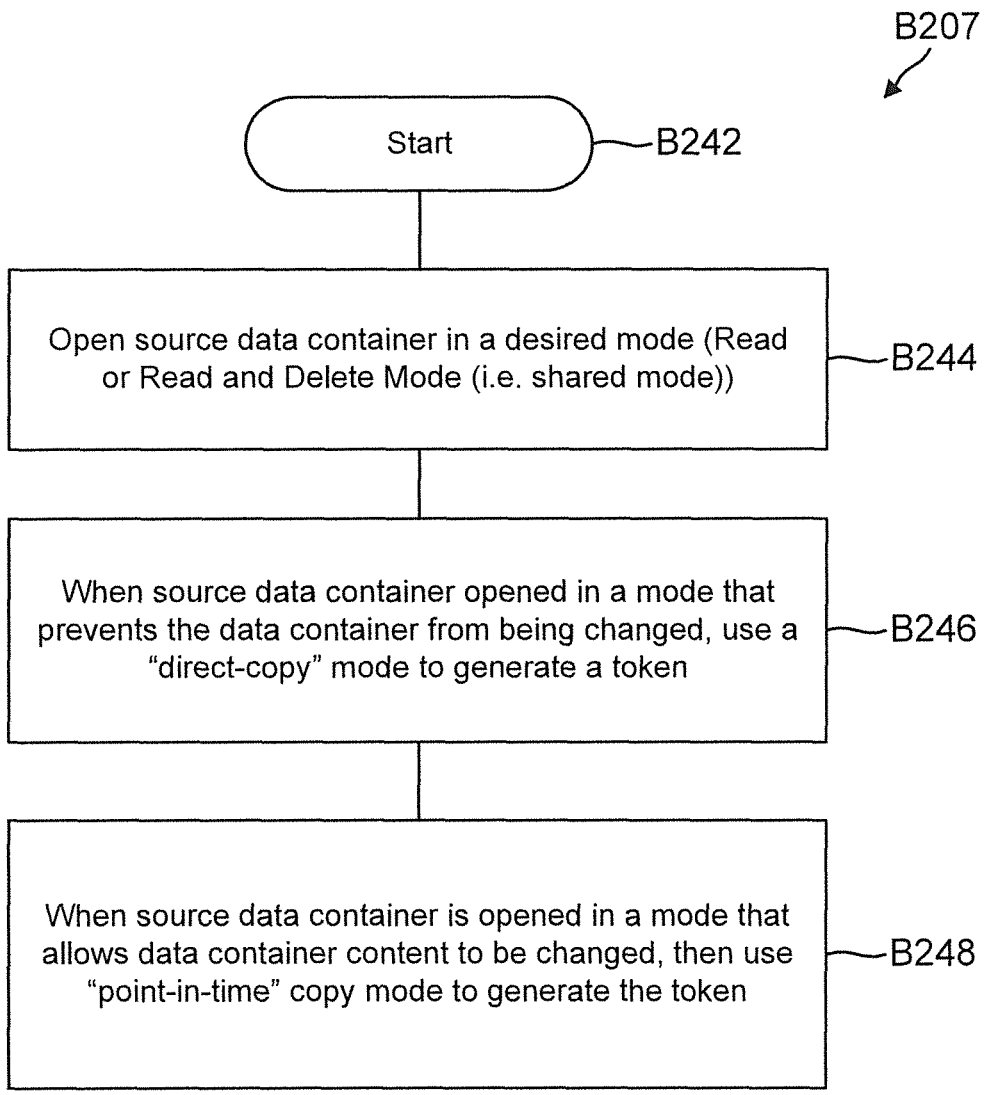

FIG. 2E shows details of process block B207, when the source data container 201A is opened, according to one aspect of the present disclosure. The process begins in block B242, when a request to open the source data container has been received by the source node. In block B244, the source node 208.1 attempts to open the source data container 201.1 in a desired, i.e. either read-mode only or read/delete mode (shared read mode) that prevents the data container from being changed during the copy-offload operation.

When the source data container is opened in a mode that prevents data from being changed, then in block B246, a token is generated by the token manager, as described below in detail using a direct copy mode.

When the source data container is opened in a write mode or a shared write mode, then the token is generated in block B248 using a point in time copy of the source data container, as described below in detail because the content of the source data container can be changed.

Figure 2F:
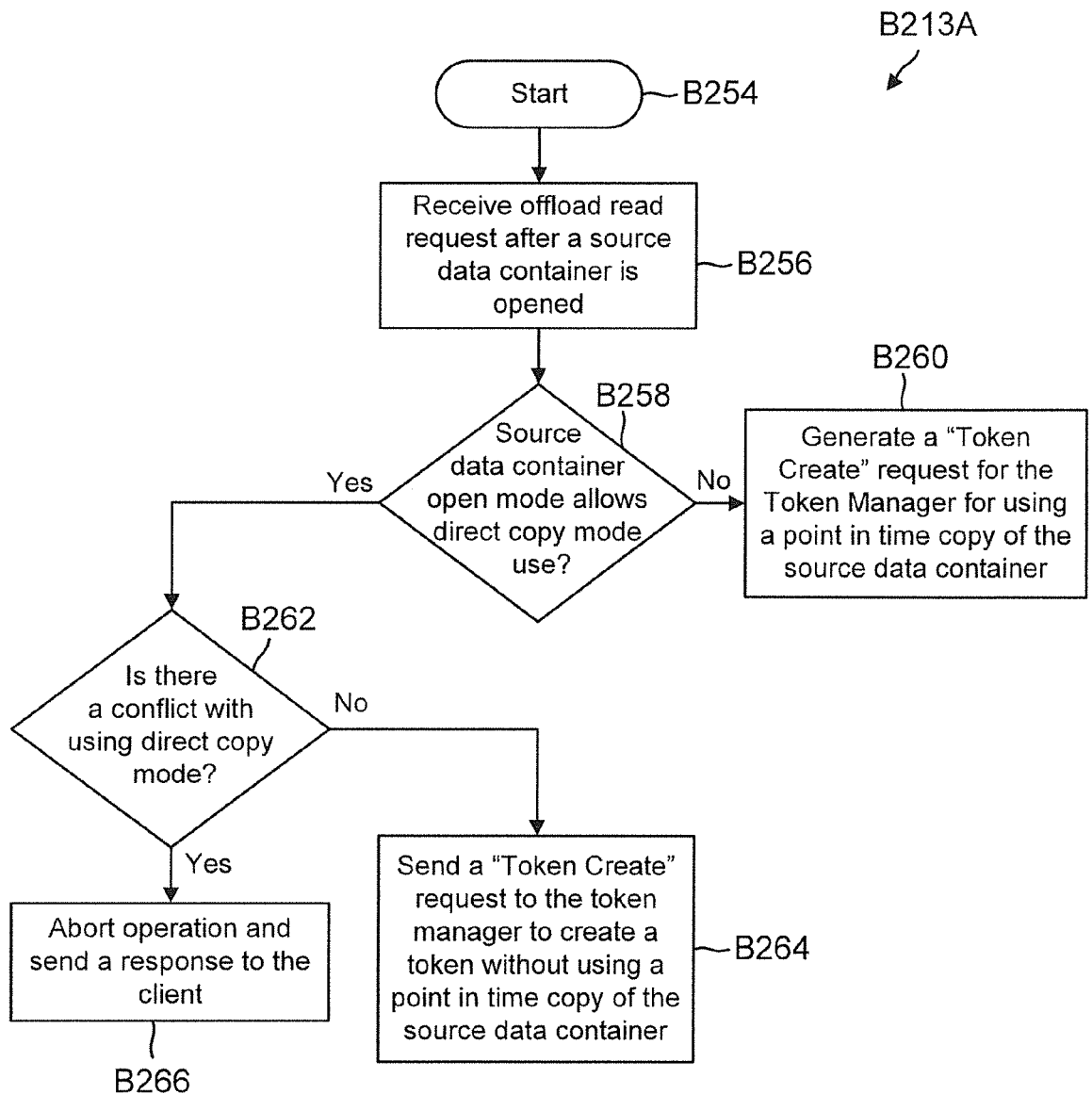

FIG. 2F shows a process flow for executing part of the offload read operation (shown as B213A) by the network interface 214 of the source node, according to one aspect. The process begins in block B254. In block B256, an offload read request for the copy-offload operation is received from the client 204 by the network interface 214 of the source node 208.1. In one aspect the request is received by the appropriate interface of the network interface 214.

In block B258, the network interface 214 determines if a "direct copy" mode can be used for generating a token. This determination is based on the state in which the source data container was opened. If the data container was opened in a read or shared read mode, then the direct copy mode can be used. Otherwise, the direct copy mode cannot be used. This information is maintained at the data structure 223A.

If the direct copy mode cannot be used, then in block B260, the network interface 214 sends a request to the token manager 230 to create a token for copying the data container using a point in time copy of the data container. The process and system for using the point in time copy is described in U.S. patent application Ser. No. 13/681,096, entitled "Inter-Protocol Copy-Offload", filed on Nov. 12, 2012, the disclosure of which is incorporated herein by its entirety.

If the direct copy mode can be used, then in block B262, the network interface 214 determines if there is any conflict with a byte range lock denying a read operation for the source data container 201A. Network interface 214 may use the data structure 223A to determine if there are any conflicting locks for the data container. Alternatively, the lock information may be obtained from the lock manager 237 and data structure 237A. A conflicting lock may deny a read operation for the requested data container.

If there is no conflict, then in block B264, the network interface 214 sends a request to the token manager 230 to create a token in the direct copy mode, without taking a point in time copy.

If there is a conflict, the request fails and a response is sent to the client in block B266.

FIG. 2G shows a process 213B for creating a token, according to one aspect of the present disclosure. The process begins in block B272, when a token create request is received from network interface 214 as described above with respect to FIG. 2D. In block B274, the token manager 230 determines if the received token create request is for creating the token without taking a point in time copy of the data container. If not, then in block B276, a point in time copy is created of the source data container. A token entry is created with a point in time (PIT) file segment details. In one aspect, a single storage instance (SIS) clone of the data container is created by the file system 236.

If the token request is for a direct copy mode, then in block B278, the token manager 230 creates a token entry with the source data container details. The token manager 230 embeds shared lock information in the token entry. The shared lock information provides the details of the entity that owns the shared lock and the nature of the shared lock i.e. read only or read and delete. The lock information is maintained by the lock manager 237 for managing read, write and delete access to a data container. The token entry with shared lock information is then sent to the network interface 214 in block B280 and the process ends in block B281.

As an example, a token sent to the client may include a plurality of fields, including: (a) Type: This field specifies the token type. (b) Length: This field indicates the length of the token. (c) Vendor Id: This field identifies, a vendor, for example, NetApp that provides the underlying storage. (d) Version: This field indicates the version of the token. For the direct copy mode, a different version number is used compared to a version number for using the point in time copy. (e) Protocol: This field includes the protocol that is used to create the token, for example, SMB (Server Message Block) protocol. (f) File Handle: This provides a volume identifier of the source data container. (g) Key: This field is a unique identifier for the token. (h) Cluster Identifier: This field identifies the cluster that created the token. This identifier can be used to determine if the copy-offload operation is within the same cluster or across another cluster. (i) Source storage interface identifier: This field identifies the source storage interface. (j) Destination storage interface identifier: This field identifies the destination storage interface identifier. (k) VServer Identifier: This field identifies the Vserver that created the token. (l) Shared Lock information: This field identifies the shared lock used for opening the source data container.

Figure 2H:
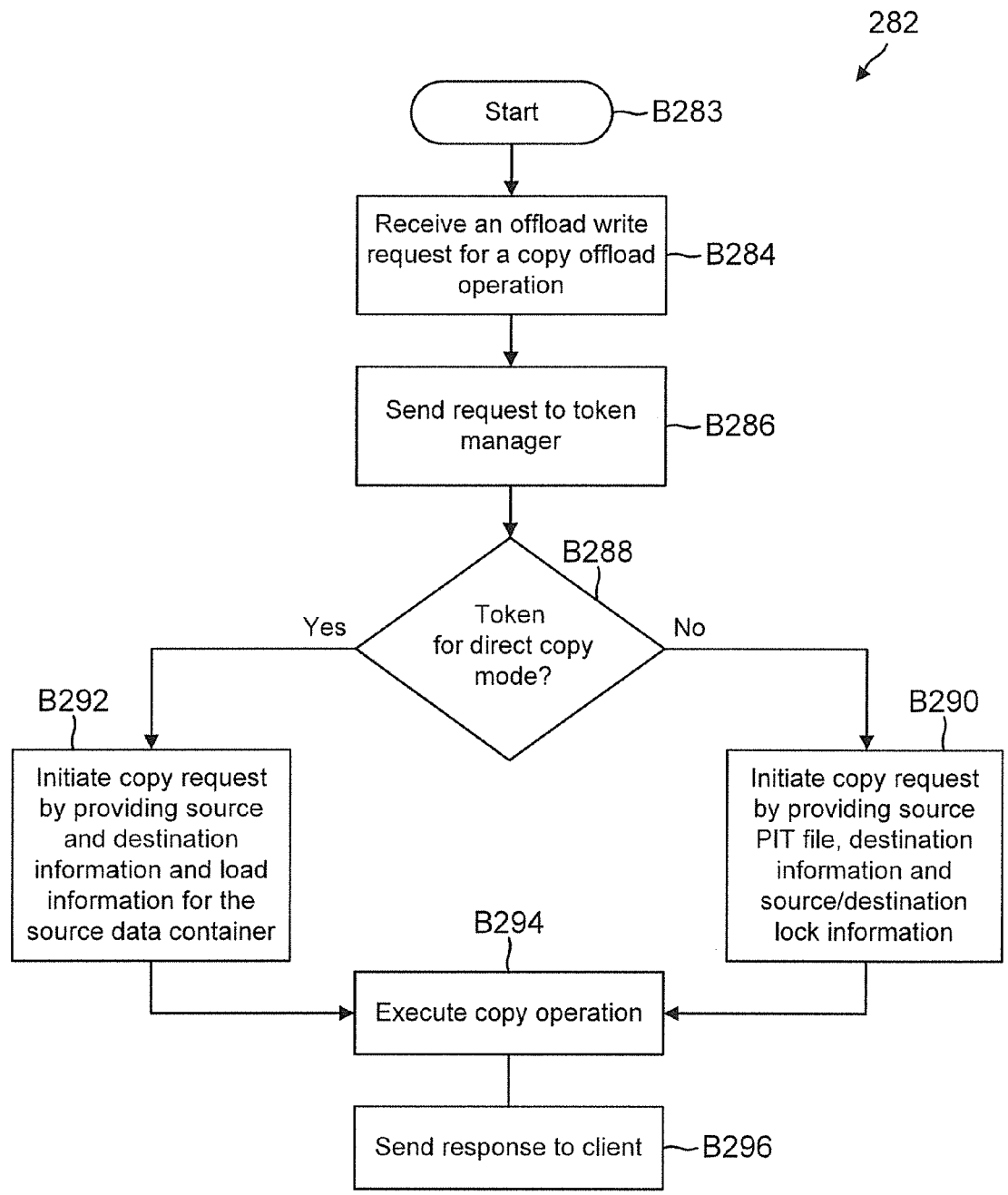

FIG. 2H shows a process 282 for performing a write portion of a copy-offload operation (maybe referred to as "write offload"), according to one aspect. The process begins in block B283, after a token entry has been created and a token has been sent to the client regarding a data container, as described above with respect to FIG. 2G. The token manager 230 maintains the data structure 231 for storing information regarding the various valid tokens that may have been generated. In response to the token, an offload write request is generated by the client 204. The offload write request is received by network interface 214 and the request is validated in block B284. Network interface 214 parses the write request to determine if the client is authorized to make the write request for a copy-offload operation. After the request is validated, in block B286, the network interface 214 sends a token copy request to the token manager 230.

In block B288, the token manager 230 looks up the token entry details at token data structure 231 and determines if the request is for a direct copy mode. If not, then in block B290, a copy request is initiated for the copy manager 232. The source data container is specified as the PIT file and the copy manager 232 is provided with the destination and destination lock information, if any. Thereafter, the process moves to block B294 that is described below in detail with respect to FIG. 2I.

If the copy request is for a direct copy mode, then in block B292, the copy request is initiated with the copy manager 232. The request specifies the source data container, the destination location and the lock information for locks at the source and destination nodes.

In block B294, the copy operation is performed using one of the copy engines 234A-234N. A response is provided to the network interface 214. Thereafter, in block B296, a response is sent to the client.

Figure 2I:
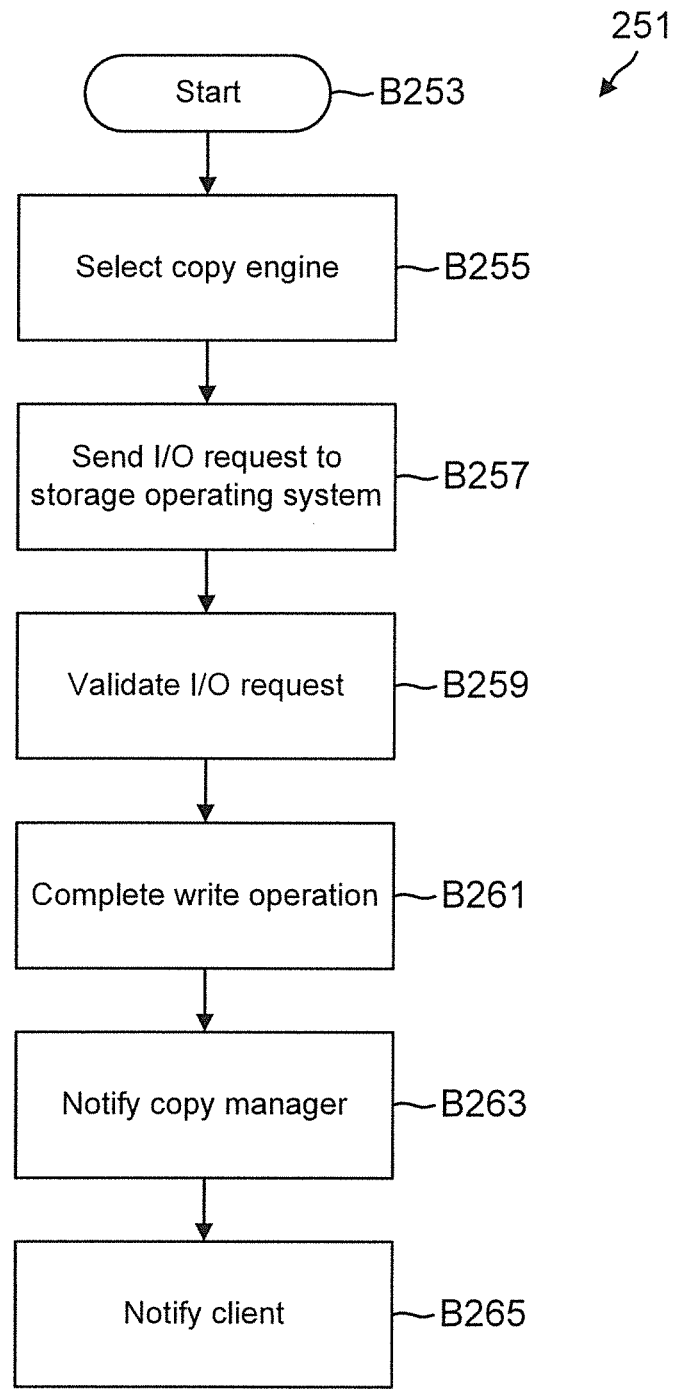

FIG. 2I shows a process 251 for performing the copy operation for a copy-offload request, according to one aspect of the present disclosure. The process begins in block B253, when the token processing of FIG. 2F has been completed. In block 5255, a copy engine 234 is selected by the copy manager 232 for performing the copy operation. The copy engine is selected based on the location of the source and the destination data containers i.e. whether the data containers are on the same volume on a same node or across nodes.

In block 5259, the I/O request is validated. The validation is to ensure that all the shared lock protecting the source data container is still valid. Thereafter, in block 5261, the storage operating system copies the source data container to the destination. The copy manager 232 is notified in block B263 and thereafter, the client is notified in block B265.

The foregoing aspects have various advantages in executing a copy-offload operation. For example, a point in time copy is not used when a direct copy-offload mode is appropriate. This saves processing resources and time.

Figure 3:
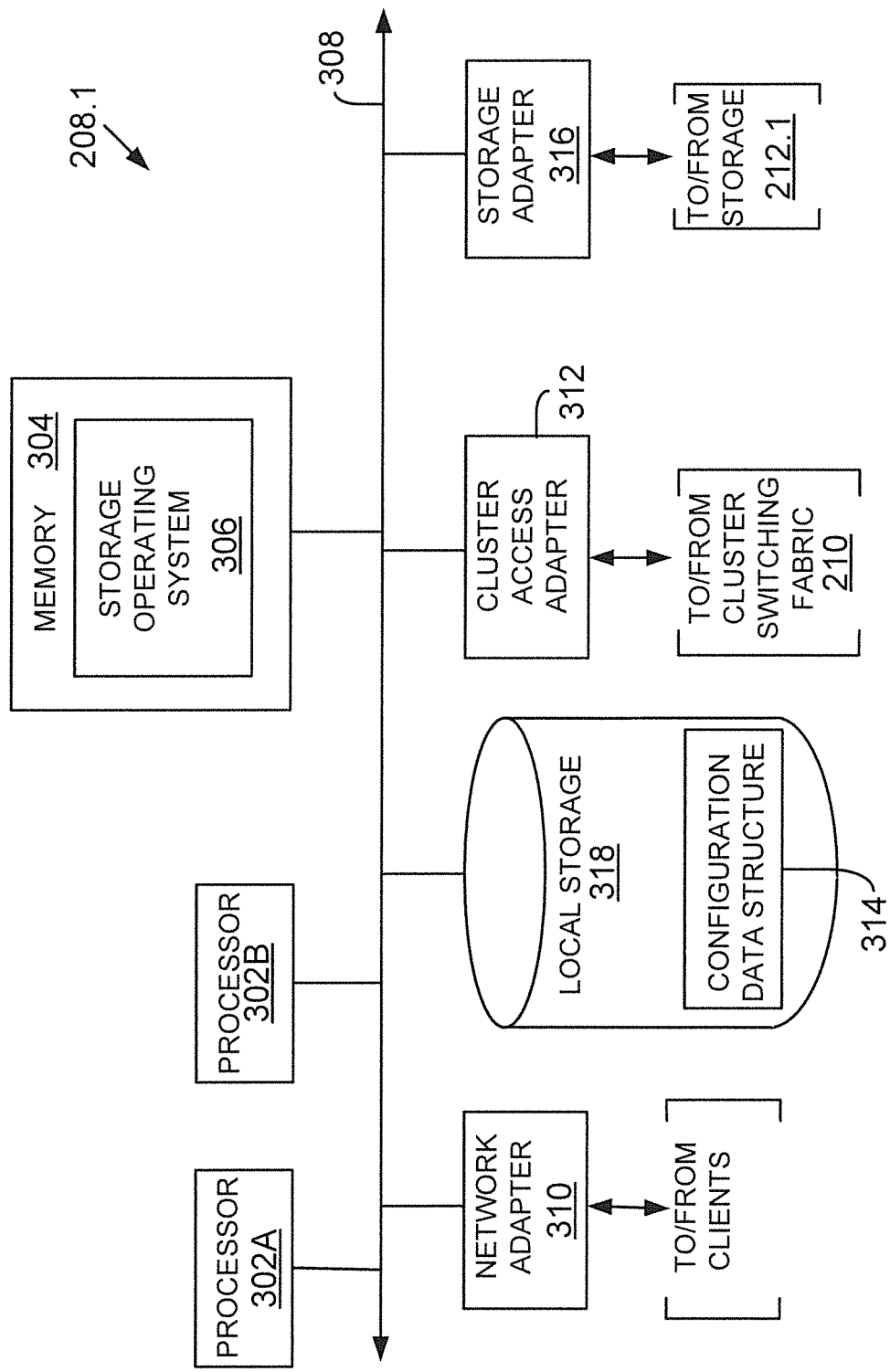
FIG. 3 shows an example of a node used in a cluster based storage system, according to one aspect of the present disclosure of the present disclosure.

Storage System Node 208.1:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 318 interconnected by a system bus 308. The local storage 318 comprises one or more storage devices utilized by the node to locally store configuration information (e.g., in a configuration data structure 314) for enabling or disabling the direct copy mode for a copy-offload operation.

The cluster access adapter 312 comprises a plurality of ports adapted to couple node 208.1 to other nodes of cluster 200. In the illustrative aspect, Ethernet (or any other protocol) may be used as the clustering protocol and interconnect media, although it will be apparent to those skilled in the art that other types of protocols and interconnects may be utilized within the cluster architecture described herein. In alternate aspects where the network interfaces and storage interfaces are implemented on separate storage systems or computers, the cluster access adapter 312 is utilized by the network interface/storage interface for communicating with other network interface/storage interface in the cluster 200.

Each node 208.1 is illustratively embodied as a dual processor storage system executing a storage operating system 306 (similar to 109, FIG. 1) that preferably implements a high-level module, such as a file system (236, FIG. 2B), to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the network interface 104 on the node, while the other processor 302B executes the functions of the storage interface 106.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the present disclosure.

The storage operating system 306, portions of which is typically resident in memory and executed by the processing elements, functionally organizes the node 208.1 by, inter alia, invoking storage operations in support of the storage service implemented by the node.

The network adapter 310 comprises a plurality of ports adapted to couple the node 208.1 to one or more clients 204.1/204.2 over point-to-point links, wide area networks, virtual private networks implemented over a public network (Internet) or a shared local area network. The network adapter 310 thus may comprise the mechanical, electrical and signaling circuitry needed to connect the node to the network 206 (FIG. 2A).

The storage adapter 316 cooperates with the storage operating system 306 executing at node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
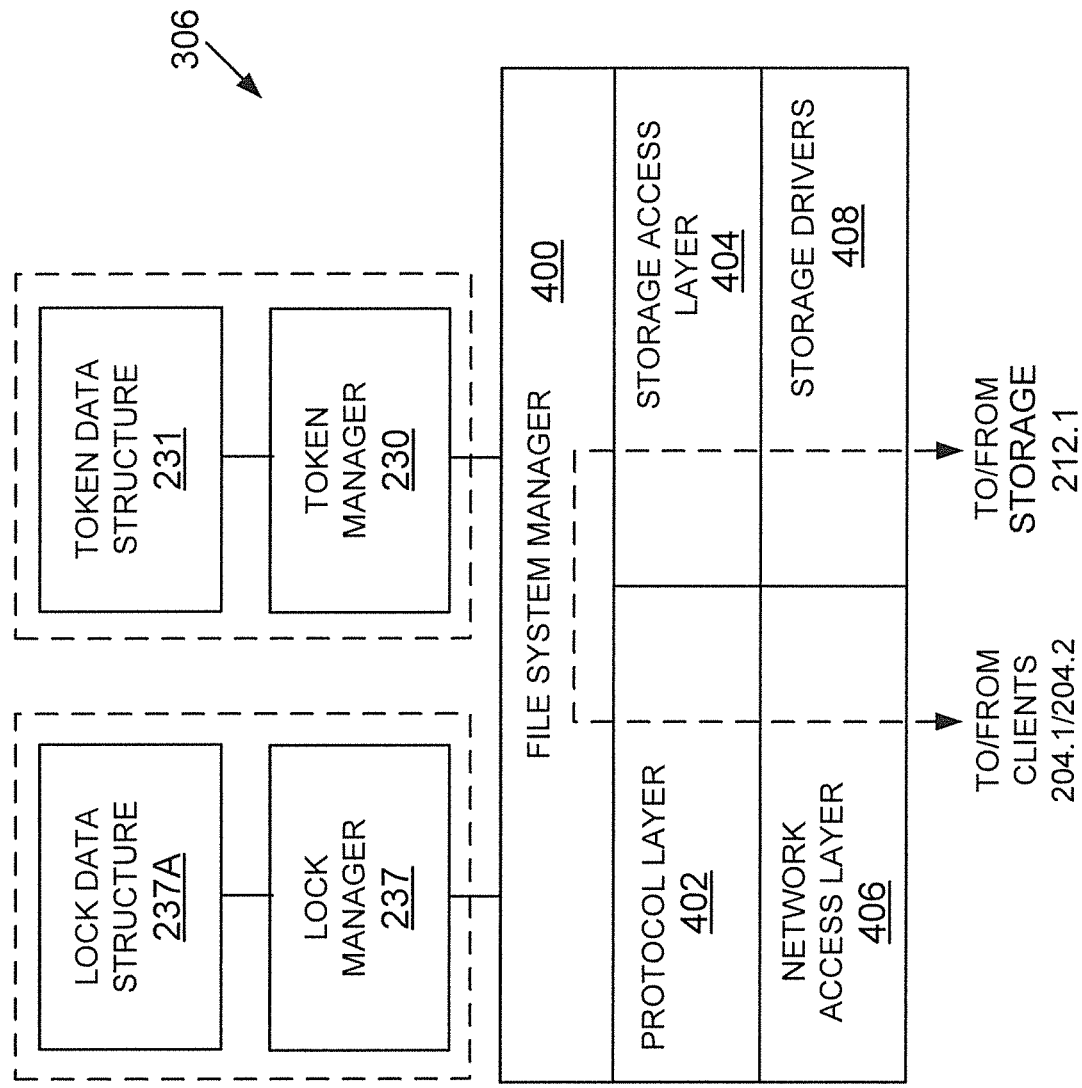
FIG. 4 shows a block diagram of an operating system, used according to one aspect of the present disclosure.

Operating System:

FIG. 4 illustrates a generic example of storage operating system 306 executed by node 208.1, according to one aspect of the present disclosure. The storage operating system 306 manages all the storage volumes and conducts read and write operations. The storage operating system 306 interfaces with or includes the lock manager 237 and the token manager 230, as described above in detail.

In one example, storage operating system 306 may include several modules, or "layers" executed by one or both of network interface 214 and storage interface 216. These layers include a file system manager 400 (similar to 236, FIG. 2B) that keeps track of a directory structure (hierarchy) of the data stored in storage devices and manages read/write operations, i.e. executes read/write operations on storage in response to client 204.1/204.2 requests.

Operating system 306 may also include a protocol layer 402 and an associated network access layer 406, to allow node 208.1 to communicate over a network with other systems, such as clients 204.1/204.2. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between clients' 204.1/204.2 and mass storage devices 212.1 are illustrated schematically as a path, which illustrates the flow of data through operating system 306.

The operating system 306 may also include a storage access layer 404 and an associated storage driver layer 408 to allow storage interface 216 to communicate with a storage device.

The storage access layer 404 may implement a higher-level storage protocol, such as RAID, while the storage driver layer 408 may implement a lower-level storage device access protocol, such as FC or SCSI.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the various inventive aspects described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
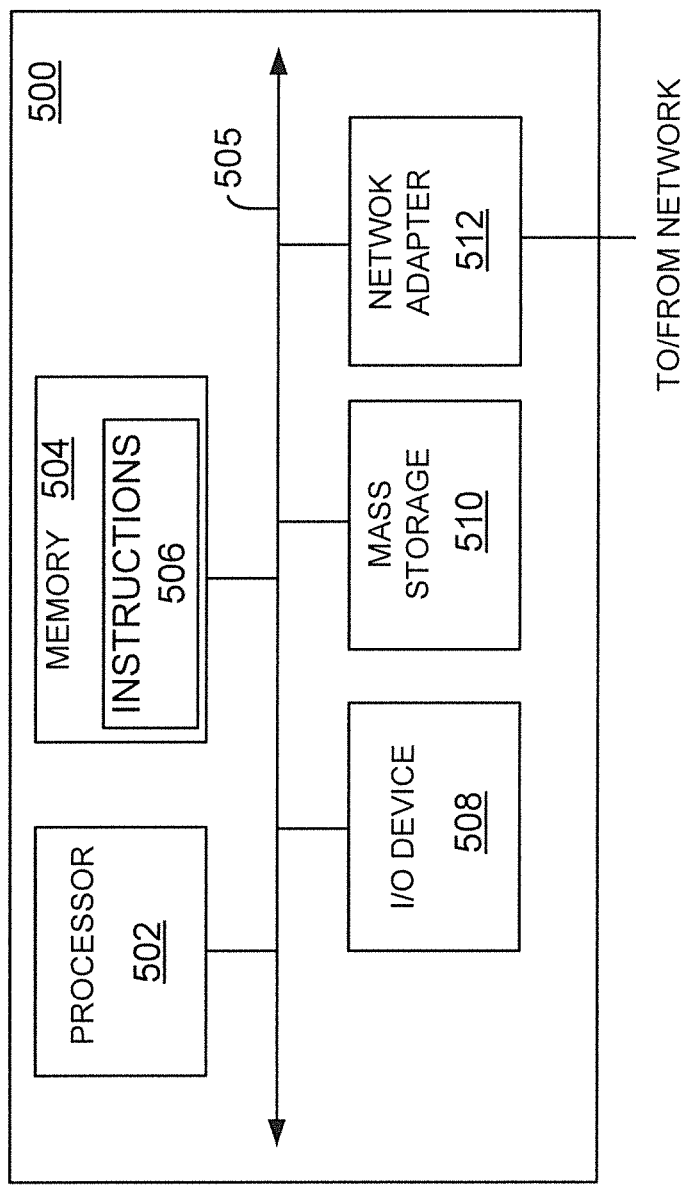
FIG. 5 shows an example of a processing system used according to one aspect of the present disclosure.

Processing System:

FIG. 5 is a high-level block diagram showing an example of the architecture of a processing system that may be used according to one aspect. The processing system 500 can represent management console 120, client 104/204 or storage system 108, for example. Note that certain standard and well-known components which are not germane to the present disclosure are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing machine executable code stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 which implement the process steps described above may reside in and execute (by processors 502) from memory 504.

Also connected to the processors 502 through the bus system 505 are one or more internal mass storage devices 510, and a network adapter 512. Internal mass storage devices 510 may be or include any conventional medium for storing large volumes of data in a non-volatile manner, such as one or more magnetic or optical based disks. The network adapter 512 provides the processing system 500 with the ability to communicate with remote devices (e.g., storage servers 20) over a network and may be, for example, an Ethernet adapter, a Fibre Channel adapter, or the like.

The processing system 500 also includes one or more input/output (I/O) devices 508 coupled to the bus system 63. The I/O devices 508 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. After the application layer, is a cloud platform and cloud infrastructure, followed by a "server" layer that includes hardware and computer software designed for cloud specific services. In this example, a source storage system and a destination storage system may be presented in a cloud for storing information.

Thus, a method and apparatus for copying a source data container from a source location to a destination location have been described. Note that references throughout this specification to "one aspect" or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the present disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   determining if content of a source data container can be changed, after the source data container is opened for a copy-offload operation having an offload read operation and an offload write operation to copy the source data container from a source location to a destination location;
   wherein to execute an offload read request, a storage system that manages a storage device returns a token to a client in response to the offload read request, where the token represents the content of the source data container;
   using a direct copy mode for generating the token for the offload read operation, without taking a point in time image of the source data container, when the content cannot be changed based on a mode in which the source data container is opened; and selecting a point in time copy mode by taking the point in time image of the source data container for generating the token, when the content can be changed; wherein the token created in direct copy mode differs from the token created in the point in time copy mode.

2. The method of claim 1, wherein the direct copy mode is used when there is no conflict with any existing lock for the source data container issued by a storage operating system of the storage system.

3. The method of claim 1, wherein a token manager module generates the token in response to the offload read request and maintains a data structure for tracking tokens that have been generated by the token manager with information regarding a shared lock for the source data container.

4. The method of claim 3, wherein a token version used for the token indicates whether to use the direct copy mode or the point in time copy mode for the copy-offload operation.

5. The method of claim 1, wherein the direct copy mode is used when the source data container is opened in a read mode or a shared read mode that does not allow the content to be changed.

6. The method of claim 1, wherein the source location is managed by a source node and a destination location is managed by a destination node.

7. The method of claim 1, wherein the direct copy mode is a configurable feature that is enabled and disabled by a management application interfacing with the storage system.

8. A non-transitory, machine readable storage medium having stored thereon instructions for performing a method for a copy-offload operation, comprising machine executable code which when executed by at least one machine, causes the machine to:

determine if content of a source data container can be changed, after the source data container is opened for a copy-offload operation having an offload read operation and an offload write operation to copy the source data container from a source location to a destination location;

wherein to execute an offload read request, a storage system that manages a storage device returns a token to a client in response to the offload read request, where the token represents the content of the source data container;

use a direct copy mode for generating the token for the offload read operation, without taking a point in time image of the source data container, when the content cannot be changed based on a mode in which the source data container is opened; and select a point in time copy mode by taking the point in time image of the source data container for generating the token, when the content can be changed; wherein the token created in direct copy mode differs from the token created in the point in time copy mode.

9. The storage medium of claim 8, wherein the direct copy mode is used when there is no conflict with any existing lock for the source data container issued by a storage operating system of the storage system.

10. The storage medium of claim 8, wherein a token manager module generates the token in response to the offload read request and maintains a data structure for tracking tokens that have been generated by the token manager with information regarding a shared lock for the source data container.

11. The storage medium of claim 10, wherein a token version used for the token indicates whether to use the direct copy mode or the point in time copy mode for the copy-offload operation.

12. The storage medium of claim 8, wherein the direct copy mode is used when the source data container is opened in a read mode or shared read mode that does not allow the content to be changed.

13. The storage medium of claim 8, wherein the source location is managed by a source node and a destination location is managed by a destination node.

14. The storage medium of claim 8, wherein the direct copy mode is a configurable feature that is enabled and disabled by a management application interfacing with the storage system.

15. A system, comprising:

a memory having machine readable medium comprising machine executable code having instructions stored thereon; and a processor module coupled to the memory configured to execute the machine executable code to:

determine if content of a source data container can be changed, after the source data container is opened for a copy-offload operation having an offload read operation and an offload write operation to copy the source data container from a source location to a destination location;

wherein to execute an offload read request, a storage system that manages a storage device returns a token to a client in response to the offload read request, where the token represents the content of the source data container;

use a direct copy mode for generating the token for the offload read operation, without taking a point in time image of the source data container, when the content cannot be changed based on a mode in which the source data container is opened; and select a point in time copy mode by taking the point in time image of the source data container for generating the token, when the content can be changed wherein the token created in direct copy mode differs from the token created in the point in time copy mode.

16. The system of claim 15, wherein the direct copy mode is used when there is no conflict with any existing lock for the source data container issued by a storage operating system of the storage system.

17. The system of claim 15, wherein a token manager module generates the token in response to the offload read request and maintains a data structure for tracking tokens that have been generated by the token manager with information regarding a shared lock for the source data container.

18. The system of claim 17, wherein a token version used for the token indicates whether to use the direct copy mode or the point in time copy mode for the copy-offload operation.

19. The system of claim 15, wherein the direct copy mode is used when the source data container is opened in a read mode or shared read mode that does not allow the content to be changed.

20. The system of claim 15, wherein the source location is managed by a source node and a destination location is managed by a destination node.

21. The system of claim 15, wherein the direct copy mode is a configurable feature that is enabled and disabled by a management application interfacing with the storage system.

* * * * *